Oct. 31, 1961 F. M. KRANTZ 3,006,982

MOUNTING SYSTEM FOR PRINTED CIRCUITS

Filed Oct. 10, 1958

INVENTOR.
FRANK M. KRANTZ
BY Wade Koontz
Ruth Codier
ATTORNEY

United States Patent Office 3,006,982

Patented Oct. 31, 1961

3,006,982

MOUNTING SYSTEM FOR PRINTED CIRCUITS

Frank M. Krantz, Ellicott City, Md., assignor, by mesne assignments, to the United States of America as represented by the Secretary of the Air Force Filed Oct. 10, 1958, Ser. No. 766,632
2 Claims. (Cl. 174—68.5)

This invention relates to a mounting or a mounting system for printed circuit cards and boards and, more particularly, to a border-like frame which mounts and encloses the circuit board.

Among the outstanding difficulties arising in the use of printed card circuits, the problem of stability and the effect of shock and vibration are well known. In addition to printed circuitry, printed boards also carry tubes and other components, which may vibrate and set up resonances. These resonances are the cause of many unnecessary failures.

There is also the problem of cooling which is inherent in printed circuitry. Plastic, which has wide use in printed circuitry, is a poor conductor of heat and unless other means for cooling are supplied, the cooling must depend entirely on convection currents. This method of cooling is ineffectual, particularly under crowded conditions.

The object of the invention is the obviating of these difficulties in the use of printed card circuits, either used singly or in systems where a plurality of printed cards are used.

A further object of the invention is the provision of a hollow extruded frame, rectangular in cross section and having a pair of parallel arms, which clamp over the edge of the board and accommodate all standard thicknesses of printed circuit boards.

A further object of the invention is the provision of a frame as described above wherein the outside vertical wall of the frame acts as a column in tension, and wherein the top and bottom horizontal walls operate as cantilevers.

A further object of the invention is the provision of a firm, unyielding boundary clamping frame for mounting a printed circuit board to control resonances which may be set up in the boards during operation and prevent membrane vibration when tubes and other apparatus are removed from its surface.

A further object of the invention is the provision of a boundary clamping frame which is capable of restraining resonance and vibration to moderate amplitudes and to prevent damage to the circuit board or card under shock conditions.

A further object of the invention is the provision of a system whereby a plurality of boards can be mounted in drawers or frames, and wherein the assembly is relatively protected and capable of being securely mounted with a minimum number of fastenings.

A further object of the invention is the provision of a protective mounting which prevents damage to the circuit board under conditions of use, transportation, storing, etc. without the addition of excessive weight.

A still further object of the invention is to provide an efficient and positive path to ground which completely encircles the board and provides ground through the low resistance frame to the coppered edge of the board and also by grounding the frame or clamping it to the chassis of another mounting.

Another object of the invention is to alleviate the cooling problems inherent in printed circuitry as above noted. The copper frame provided by the present invention insures dissipation of heat by conduction and the inefficient convection currents need not be entirely relied upon.

Other objects and advantages of the invention will appear obvious as the description proceeds.

In mounting, printed circuit cards are sometimes placed horizontally or they may be placed vertically and parallel in racks closely adjacent or separated as the system may require. For simplification of the description, the present frames are described as resting in a horizontal position but it will be understood that the invention is not so limited.

Figure 1:
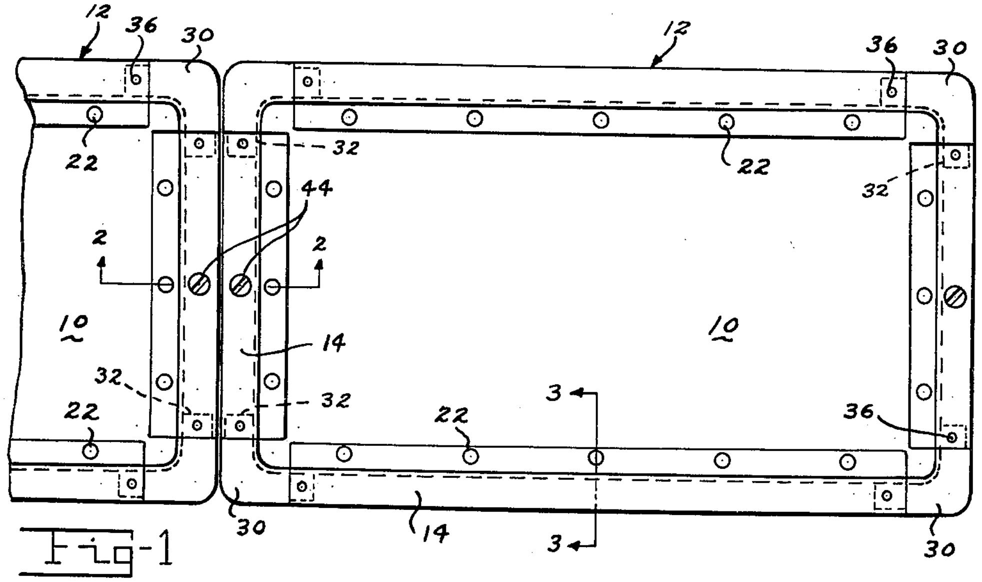
FIG. 1 is a top plan view of two printed circuit cards, a portion of one being broken away.
Figure 3:
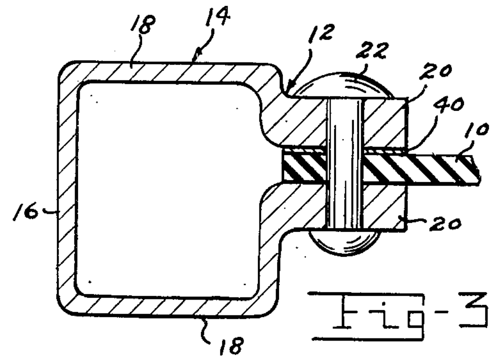
FIG. 3 is a further enlarged section taken on the line 3—3 of FIG. 1.
Figure 4:
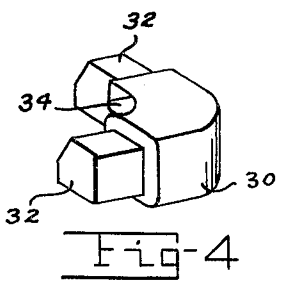
FIG. 4 is a perspective view of one of the corner fittings.

Referring more in detail to the drawing, a series of printed circuit cards or boards are represented generally by the numeral 10. A frame is provided for each board and these frames are indicated in general by the numeral 12. The cards 10 may be used singly or in a series as suggested in FIG. 1. The frames 12 are made up of a series of units 14 capable of being connected in forms and sizes to fit varying sizes of printed cards and boards. The frame units 14 are hollow and rectangular in cross section as shown in FIG. 3. These frame members are preferably of lightweight extruded metal which will provide the necessary resilience for the column in tension, the cantilever and the clamping action, together with lightness of weight required of the frame unit. It is conceivable, however, that the frame may be also made of other materials having the required characteristics.

The hollow frame units 14 are comprised of a rear vertical wall 16, upper and lower horizontal walls 18 and a pair of spaced parallel flanges 20. In use, the flanges 20 are sprung over the edges of the printed circuit board 10 and are secured to it by means of rivets 22. The rear wall is capable of flexing and becomes a column in tension while the walls 18 act as cantilever arms so that the flanges 20 are always parallel. A rectangular boundary frame is obtained by connecting frame units 14 by means of a corner section 30. The corner section 30 has a pair of normally extending studs 32 which slip into the hollow ends of the frame units 14 and are secured thereto by rivets, bolts or other means 34. The element 30 may be a casting. Since the channel or frame members 14 are so formed that the flanges 20 are always in parallel relationship, they clasp the edge of the printed board tightly over a substantial edge area even though the thicknesses of these boards may vary. Thus, a considerable clamping range is provided for the tolerance variation on the board material.

A copper boundary strip 40 is secured to the peripheral surface area of the board 10. By making a very fine heat conducting joint between the copper boundary strip 40 and the boundary frame, heat generated in the board is dissipated by direct conduction. A good electrical contact is also assured and a good ground is thus provided for the whole system.

When the flanges 20 are sprung to receive the card 10, the vertical wall 16 acts as a column in tension and the horizontal upper and lower walls 14 and 18 are capable of cantilever action, become cantilever arms and remain parallel, regardless of the varying thicknesses of the boards. These characteristics insure that the flanges 20 are parallel at all times regardless of the thickness of the circuit card 10. It also assures spring clamping action and a tight contact with the edge of the board.

Figure 2:
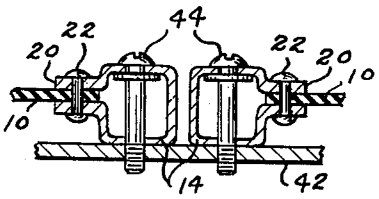
FIG. 2 is an enlarged section taken on the line 2—2 of FIG. 1.

A circuit board may be mounted alone in a system or the system may require a plurality of boards. These frames are so formed that they may be placed side by side or end to end and secured to a drawer or frame, represented by the numeral 42 in FIG. 2. Captivated screws 44 are passed through openings provided in the upper and lower horizontal walls 18 and are screwed into the equipment drawer or frame 42. The frames may also stand vertical and parallel with captivated screws penetrating the wall 16, as desired.

While the invention is shown and described in connection with one form for illustrative, rather than restrictive purposes, it is obvious that changes and modifications may be made by those skilled in the art without departing from the scope and spirit of the invention as defined in the accompanying claims.

I claim:

1. A separable frame for supporting the perimeter of a printed circuit board comprising a plurality of extruded channel sections having spaced substantially parallel flanges tensioned to clamp and support the sides and ends of the board, corner members having reduced extensions to telescope into the ends of said extruded channels, means for securing the said corner members in the ends of said extruded channels, means extending through said flanges and the board for clamping the flanges against the opposite side edges of the board, and a plurality of captivated screws carried by and extending through said extruded channel sections normal to the printed circuit board for securing the frame and board to a supporting surface.

2. A printed circuit system comprising a board, an extended surface on said board for receiving elements of a printed circuit, a metal boundary strip having high heat and electrical conducting properties secured to the area of said surface and constituting the boundary edge thereof, a frame for said board comprising hollow channel elements, clamping arms on said channel elements for engaging the edge area of said board, flat areas on said arms, said flat areas contacting said metal boundary strip in heat conducting and electrical conducting relationship and holding said board spaced from the hollow interior of said channel elements.

References Cited in the file of this patent

UNITED STATES PATENTS

| | | |
|---|---|---|
| 936,451 | Havenhill | Oct. 12, 1909 |
| 2,079,635 | Sharp | May 11, 1937 |
| 2,228,352 | Hopfield | Jan. 14, 1941 |
| 2,508,030 | Karns | May 16, 1950 |
| 2,631,913 | Rosenberg | Mar. 17, 1953 |
| 2,668,032 | Haefner | Feb. 2, 1954 |
| 2,743,980 | Hobbs | May 1, 1956 |
| 2,773,726 | Johansson et al. | Dec. 11, 1956 |
| 2,821,754 | Hillson | Feb. 4, 1958 |